United States Patent [19]

Muchnik et al.

[11] Patent Number: 4,861,671
[45] Date of Patent: Aug. 29, 1989

[54] MAGNETO-OPTIC RECORDING MEDIA WITH PROTECTIVE LAYER

[75] Inventors: Boris J. Muchnik; Frank H. Robertson, III, both of Boulder, Colo.

[73] Assignee: Kerdix, Inc., Boulder, Colo.

[21] Appl. No.: 125,401

[22] Filed: Nov. 25, 1987

Related U.S. Application Data

[63] Continuation-in-part of Ser. No. 790,497, Oct. 23, 1985, abandoned.

[51] Int. Cl.$^4$ ................................................ G11B 7/21
[52] U.S. Cl. ................................ 428/457; 427/126.3; 427/127; 427/255.1; 428/692; 428/693; 428/694; 428/698; 428/701; 428/702; 428/900
[58] Field of Search ............... 428/694, 702, 900, 692, 428/693, 658, 701, 457; 365/122; 360/131, 135; 369/13, 288; 430/945; 427/126.3, 127, 255.1

[56] References Cited

U.S. PATENT DOCUMENTS

| | | |
|---|---|---|
| 3,701,133 | 10/1972 | Smaller et al. . |
| 4,410,583 | 10/1983 | Hanaoka . |
| 4,412,264 | 10/1983 | Imamura et al. . |
| 4,414,650 | 11/1983 | Ohta et al. . |
| 4,466,035 | 3/1984 | Connell et al. . |
| 4,478,872 | 10/1984 | Pulliam . |
| 4,497,006 | 1/1985 | Deguchi et al. . |
| 4,649,451 | 3/1987 | Tomita ................................ 428/900 |
| 4,658,388 | 4/1987 | Ishiwatari et al. ................... 430/945 |
| 4,695,510 | 9/1987 | Sawamura et al. ................. 428/702 |
| 4,711,821 | 12/1987 | Kikuchi et al. ..................... 428/702 |

FOREIGN PATENT DOCUMENTS 145525 8/1985 Japan .
227243 10/1986 Japan .

OTHER PUBLICATIONS

"New Concepts on Magneto-Optical Memories", Gueugnon et al, IEEE Transactions on Magnetics, vol. Mag. 19, No. 5, Sep. 1983, pp. 1754–1756.
"Magneto-Optical Memory Disk Using Plastic Substrate", Sato et al. SPIE vol. 529, Optical Mask Data Storage (1985), pp. 33–38.

*Primary Examiner*—George F. Lesmes
*Assistant Examiner*—J. B. Monroe
*Attorney, Agent, or Firm*—Rosen, Dainow & Jacobs

[57] ABSTRACT

A protective layer for a magneto-optically active layer is formed of an outer impermeable layer and an inner layer that protects the active from the outer layer. The outer layer may be an oxide and the inner layer a non-oxide. The oxide and non-oxide layers may form discreet layers or they may be continuously graded. The graded layer may be formed by reactively sputtering aluminum in the presence of reactive gases, oxygen and nitrogen, while continually varying the flowing reactive gas from nitrogen to oxygen.

9 Claims, 1 Drawing Sheet

MAGNETO-OPTIC RECORDING MEDIA WITH PROTECTIVE LAYER

This application is a continuation in part of copending application Serial No. 790,497 filed Oct. 23, 1985, now abandoned.

This invention relates to magneto-optic recording media, and more particularly to a magneto-optic recording media wherein the active recording layer is a layer of ferromagnetic or ferrimagnetic alloys of rare earth and transition metal elements, such as Gadolinium or Terbium with Iron, Cobalt or Nickel.

Magneto-optic media and systems have been disclosed, for example in U.S. Pat. No. 4,466,035, Connell, having a magneto-optic recording layer. The recording of information on such a film is effected by directing a modulated laser beam to the surface of the film, the laser beam power being sufficient to heat the film locally for example to the Curie temperature of the material of the film. The film may be initially magnetically polarized in one direction, for example vertically of the film, and a magnetic field of the opposite polarity is provided adjacent the film. Those areas of the film impinged by the beam will consequently have their polarity reversed.

Magneto-optic recording thereby provides means for recording information at a density substantially greater than can be achieved with conventional magnetic recording. Thus, the laser may have a very small focussed spot on the film, for example from 0.5 to 1.0 micrometer in diameter, so that the recording density is very great.

In readout of the recorded information, a laser beam of lesser intensity is scanned across the recorded film, various techniques being employed to reproduce information relying upon the reflected light from the magneto-optic film using the Kerr effect.

Recently it is been found that one of the most promising classes of materials for the active magneto-optic recording layer of such media are ferromagnetic or ferrimagnetic alloys of rare earth and transition metal elements, for example Gadolinimum or Terbium with Iron, Cobalt or Nickel. These rare earth and transition metal alloys are advantageous for magneto-optic recording since they are amorphous, thereby eliminating polycrystalline grain noise, and they can be deposited with the requisite perpendicular anisotropy. They also have a usable magneto-optic Kerr coefficient for reflective polar Kerr effect magneto-optic readout. The use of such materials is disclosed, for example, in U.S. Pat. Nos. 4,412,264, to Imamura et al; 4,414,650, to Ohta et al; "New Concepts on Magneto-Optical Memories", Gueugnon et al, IEEE Transactions on Magnetics, Vol. MAG 19, No. 5, September 1983, pages 1754–1756 and "Magneto-Optical Memory Disk Using Plastic Substrate", Sato et al, SPIE Vol. 529, Optical, Mass Data Storage (1985), pages 33–38.

Japanese patent publication No. 60-145525, Sawamura et al, discloses a recording layer coated on one side or on both sides with a composite film of an oxide and a nitride, with a predetermined fixed ratio of nitride to oxide, e.g. a single layer of an oxynitride of homogeneous composition. The reference specifies that, although the composition ratio of the two components may be varied in the same direction to achieve different indices of refraction, the nitride to oxygen ratio in any give case must be homogeneously between 9:1 and 1:9, preferably between 7:3 and 3:7, for purposes of adhesion and attaining a desired index of refraction. Sawamura et al thus specifies the necessity of use of a partially oxide material, and not a pure nitride material, directly in contact with the recording layer.

It has further been found, however, that one of the limitations of magneto-optical media employing the above discussed rare earth and transition metal alloys, which presently prevents their commercialization of their use in magneto-optical recording, is the limited environmental stability and archival life of current laboratory media. A significant degradation mechanism is the oxidation of the magneto-optic active layer. The rare earth elements are especially prone to oxidation.

The article "Study of High Reliability of the Magneto-optic Medium with the Multilayer Structure", Katayama et al, page 55, November 1983, cited in the prosecution of U.S. patent application Ser. No. 790,497, filed Oct. 23, 1985, discloses the use of a nitride layer adjacent to a magneto-optic film, in preference to silicon dioxide, for improved coercive force Hc, since it was believed that degradation in a media with an oxide layer was caused by selective oxidation of rare earth atoms. Katayama is only concerned with this phenomena, however, and only discusses the use of a single protective layer.

The present invention is therefore directed to the provision of a magneto-optic recording media employing materials and processes for the deposition of suitable chemical barrier layers to prevent the oxidation of the magneto-optic active layer, and thereby t prolong the useful life of the magneto-optic recording media.

Various dielectric materials have been employed on either side of the active magneto-optic layer. The intended purpose of such dielectric layers may be twofold, i.e. to provide barrier protection against oxidation, and to enhance the magneto-optic effect using principles of constructive and destructive interference. Various structures involving magneto-optic, dielectric and reflective layers are known, for example, employing quadrilayer, trilayer and bilayer structures, with regard to interference enhancement of the magneto-optic signal. Various materials, such as SiO, $SiO_2$, AlN, $Al_2O_3$, ZnS, and $TiO_2$ have been investigated for the provision of improved barrier protective layers, although up to the present time a suitable barrier protective layer has not been found.

The affinity of the rare earths for oxygen is so great that even the chemically bound oxygen present in oxide barrier layers, such as $SiO_2$, $Al_2O_3$, and $TiO_2$, can contribute to the oxidation of the magneto-optic active layer. Such materials are well known, however, as excellent chemical barriers to atmospheric water, oxygen and atmospheric pollutants, and are widely used for such purposes in the electronics industry.

Non oxygen-containing dielectrics such as AlN, do not oxidize the active magneto-optic layer. Materials such as AlN have the disadvantage, however, that they hydrolyse to a substantial degree in the presence of moisture and hence are unsuitable for long-life optical media.

Therefore, in accordance with the invention, a barrier layer is provided for the magneto-optic media, having a varying composition. In one embodiment of the invention the barrier layer is comprised of a layer of AlN adjacent the active layer and a layer of $Al_2O_3$ adjacent the external surface. In another embodiment of the invention, however, the composition of the barrier layer varies gradually from pure AlN contiguous to the magneto-optic active layer, to pure $Al_2O_3$ on the opposite, external side of the barrier layer. The $Al_2O_3$ provides excellent barrier properties to environmental oxygen, water vapor and pollutants, while the AlN protects the magneto-optic layer from the oxide layer itself.

The graded composition region between the two barrier materials may comprise all or most of the thickness of the compound barrier, or, alternatively, only a small portion thereof. It is preferable that some degree of gradation be provided to insure cohesive structural integrity of the barrier layer, and to eliminate a Fresnel reflection due to an abrupt change of the index of refraction at the interface of barrier layer materials.

The compound or graded composition barrier layer may be deposited by reactive sputtering of aluminum in the presence of partial pressures of nitrogen and oxygen. The gradation of the composition is controlled by gradually varying the composition of the reactive gas from nitrogen to oxygen.

In order that the invention may be more clearly understood, it will now be disclosed with reference to the accompanying drawings, wherein.

Figure 1:
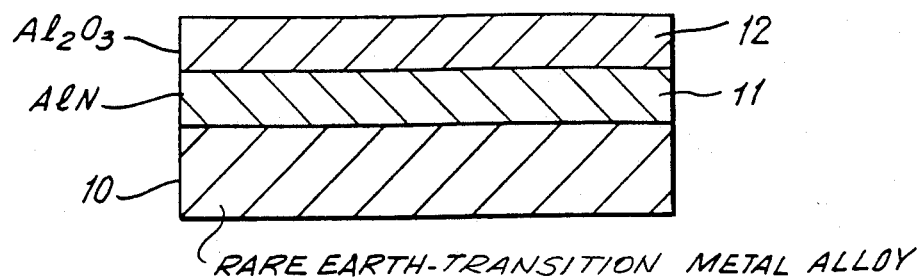
FIG. 1 is an enlarged cross sectional view of a portion of one magneto-optical media in accordance with the invention.

FIG. 1 illustrates a cross section of a magneto-optical recording medium in accordance with one embodiment of the invention comprising an active magneto-optical layer 10, for example a ferromagnetic or ferrimagnetic alloy of a rare earth and transition metal element, for example Gadolinium or Terbium with Iron, Cobalt or Nickel. Such a material has a limited environmental stability and archival life, due to degradation by oxidation of the elements of the layer.

In accordance with the invention a protective structure of layers 11 and 12 are applied to the surface of the active layer 10. While the drawing illustrates the protective layers on only one surface of the active layer, it will be apparent that all surfaces may so protected. The outer layer 12 is a non-nitride protective layer (i.e. does not include nitrides) that provides superior impermeability to atmospheric moisture, oxygen and pollutants, and may be, for example $Al_2O_3$. Since this material contains oxygen, it has been found to degrade the active layer material when in contact therewith. Accordingly, the intermediate layer 11 is of a non-oxide material (i.e. that does not include oxides) which prevents the interaction between the magneto-optic active material 10 and the impermeable material layer 12. It has been found that AlN is suitable for this purpose, since it does not react with the active layer material, nor with the protective layer 12 material.

While the embodiment of the invention illustrated in FIG. 1 provides adequate protection for the active layer from oxidation, it introduces abrupt changes in the index of refraction at the interface between the layers 11 and 12, and hence may lead to Fresnel reflection. Accordingly, in the embodiment of the invention illustrated in FIG. 2, instead of providing the discretely graded layers 11 and 12 the protection layer 13 is a unitary layer that is continuously graded throughout its depth. Thus, the layer is comprised of pure AlN at its interface 14 with the active layer 10. The exterior surface 15 of the layer 13, away from the interface 14, is pure $Al_2O_3$. The nitrogen and oxygen contents of the layer vary continuously through the depth of the layer 13. As in the embodiment of the invention illustrated in FIG. 1, it is of course apparent that all surfaces of the active layer 10 may be produced in a similar manner.

Figure 2:
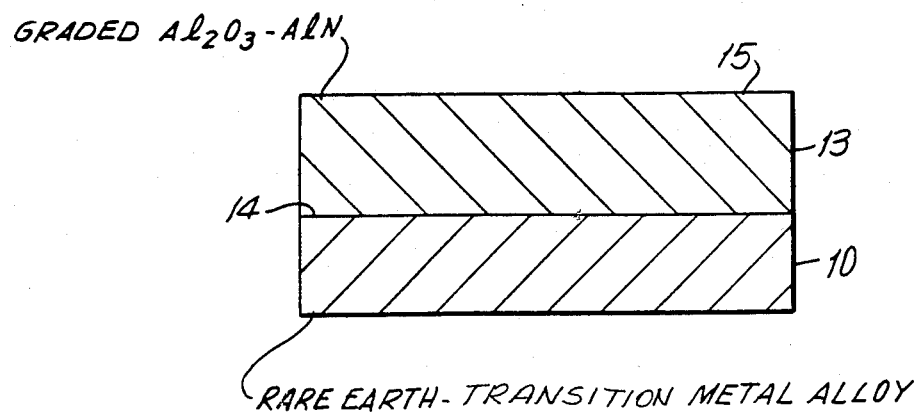
FIG. 2 is an enlarged cross sectional view of another embodiment of the magneto-optical media of the invention.

In order to provide the graded barrier or protection layer 13 as illustrated in FIG. 2, aluminum is reactively sputtered on the active layer, preferably in the presence of Argon sputtering gas, and partial pressures of the reactive gases, oxygen and nitrogen. The composition varies gradually from nitride to oxide by varying the composition of the flowing reactive gas gradually from nitrogen to oxygen in the deposition process.

It is of course apparent that materials other than $Al_2O_3$ and AlN ma be provided for the barrier layer. Thus silicon nitride may be employed adjacent the active layer 10 to protect the active layer, either in accordance with the embodiments of the invention of FIG. 1 or of FIG. 2, although it is apparent that the material adjacent the active layer 10 must be non-oxide material.

In tests of the materials of the present invention, with a pure nitride material adjacent the active layer, the material has satisfactorily survived 500 hours at 65° C. and 90% humidity without detrimental effects.

While the invention has been disclosed and described with reference to a limited number of embodiments, it is apparent that variations and modifications may be made therein, and it is therefore intended in the following claims to cover each such variation and modification as falls within the true spirit and scope of the invention.

What is claimed is:

1. A magneto-optic medium having a recording layer of an active magneto-optic material and a protective layer thereon, comprising:
    a first material of said protective layer which is not in contact with the surface of said recording layer;
    a second material of said protective layer adjacent to said surface of said recording layer;
    said first material being a pure oxide composition material layer in its uppermost layer adjacent to the external surface of said protective layer;
    said second material being a pure non-oxide composition material layer in its lowermost layer which is contiguous with said recording layer; and
    said first and second materials in said protective layer being graded in composition continuously between the pure oxide uppermost and the pure non-oxide lowermost layers within said protective layer.

2. The magneto-optic medium of claim 1, wherein said active magneto-optic material comprises an amorphous alloy of a rare earth and a transition metal.

3. The magneto-optic medium of claim 1 wherein said first material is aluminum oxide and said second material is aluminum nitride.

4. The magneto-optic recording medium of claim 1 wherein said active layer material is a rare earth and transition metal alloy, and said second material is comprised of silicon nitride deposited by reactive sputtering of silicon nitride in a sputtering gas having a partial pressure of nitrogen to maintain stoichiometry.

5. The magneto-optic medium of claim 1, wherein said first material is an oxide material and said second material is a nitride material, said second material is directly deposited in high-purity phase on the active magneto-optic layer material, said first and second materials are graded continuously through said protective layer in a manner that said first material is directly deposited in high-purity phase at the end surface of the protective layer away from the active magneto-optic layer material.

6. A method for protecting an active layer for magneto-optic medium comprising reactively sputtering aluminum on said layer in the presence of Argon sputtering gas and partial pressures of the reactive gases, oxygen and nitrogen, and gradually varying the composition of the protective layer by varying the composition of flowing reactive gas gradually from nitrogen to oxygen to provide a non-oxide material adjacent said active layer and an oxide non-nitride surface of said protective layer away from said active layer.

7. The method of claim 6 wherein said active material comprises a magneto-optically active amorphous alloy of a rare earth and a transition metal.

8. The method of producing a magneto-optic medium comprising reactively sputtering a metal on an active layer, in the presence of reactive gas, on a magneto-optic material, and varying the composition of s id reactive gas during said sputtering to be initially comprised of nitrogen without oxygen, to deposit a non-oxide material at the surface of said magneto-optic material, and to be finally comprised of oxygen without nitrogen, to provide a protective layer with a non-nitride surface.

9. The method of claim 8 wherein said step of sputtering comprises sputtering aluminum.

* * * * *